Aug. 24, 1926.
J. E. CRADDICK
WAVE MOTOR
Filed May 21, 1923    4 Sheets-Sheet 1
1,597,145
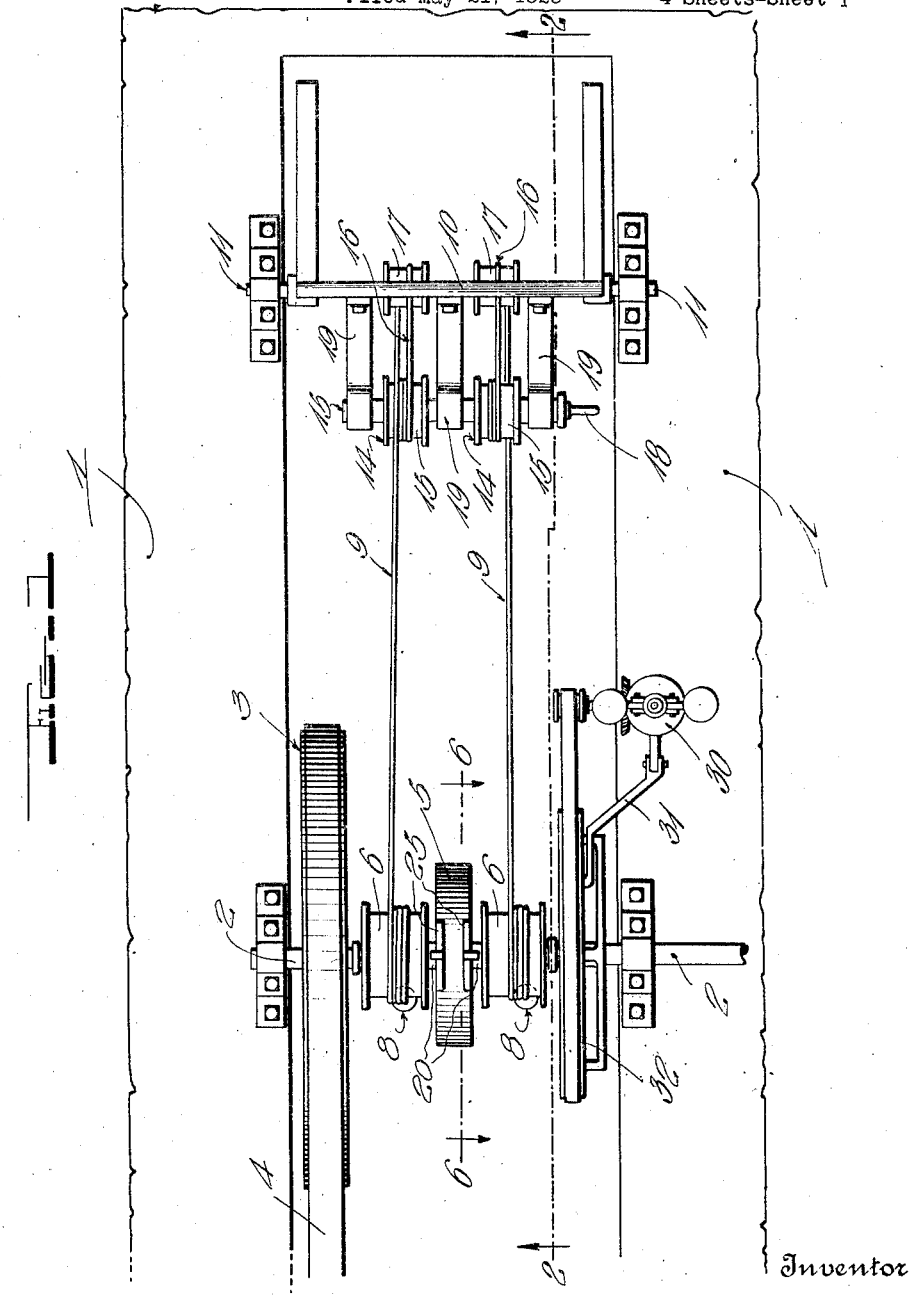
Witness
Inventor
Joel E. Craddick
By H. B. Willson & Co.
Attorneys

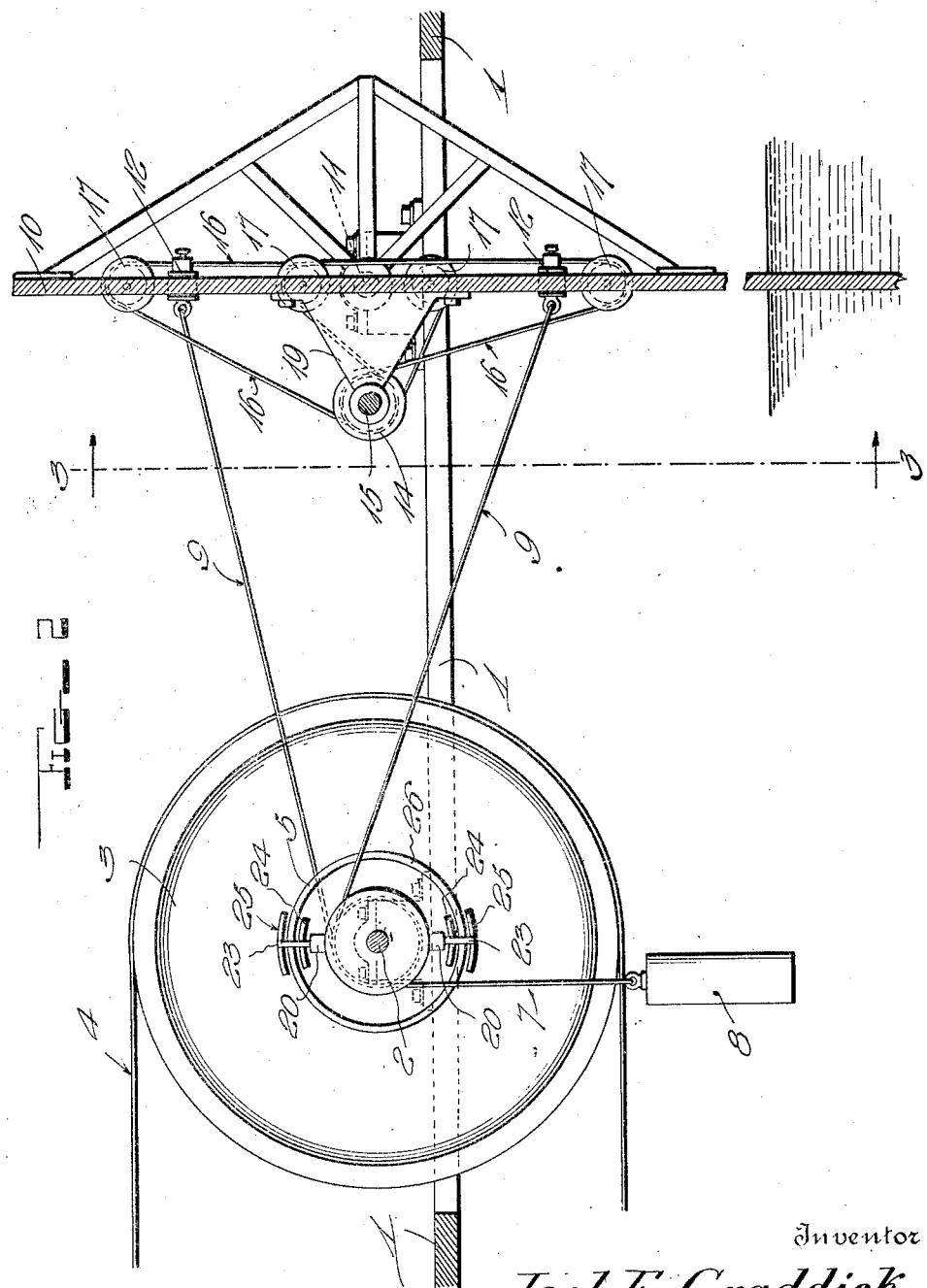

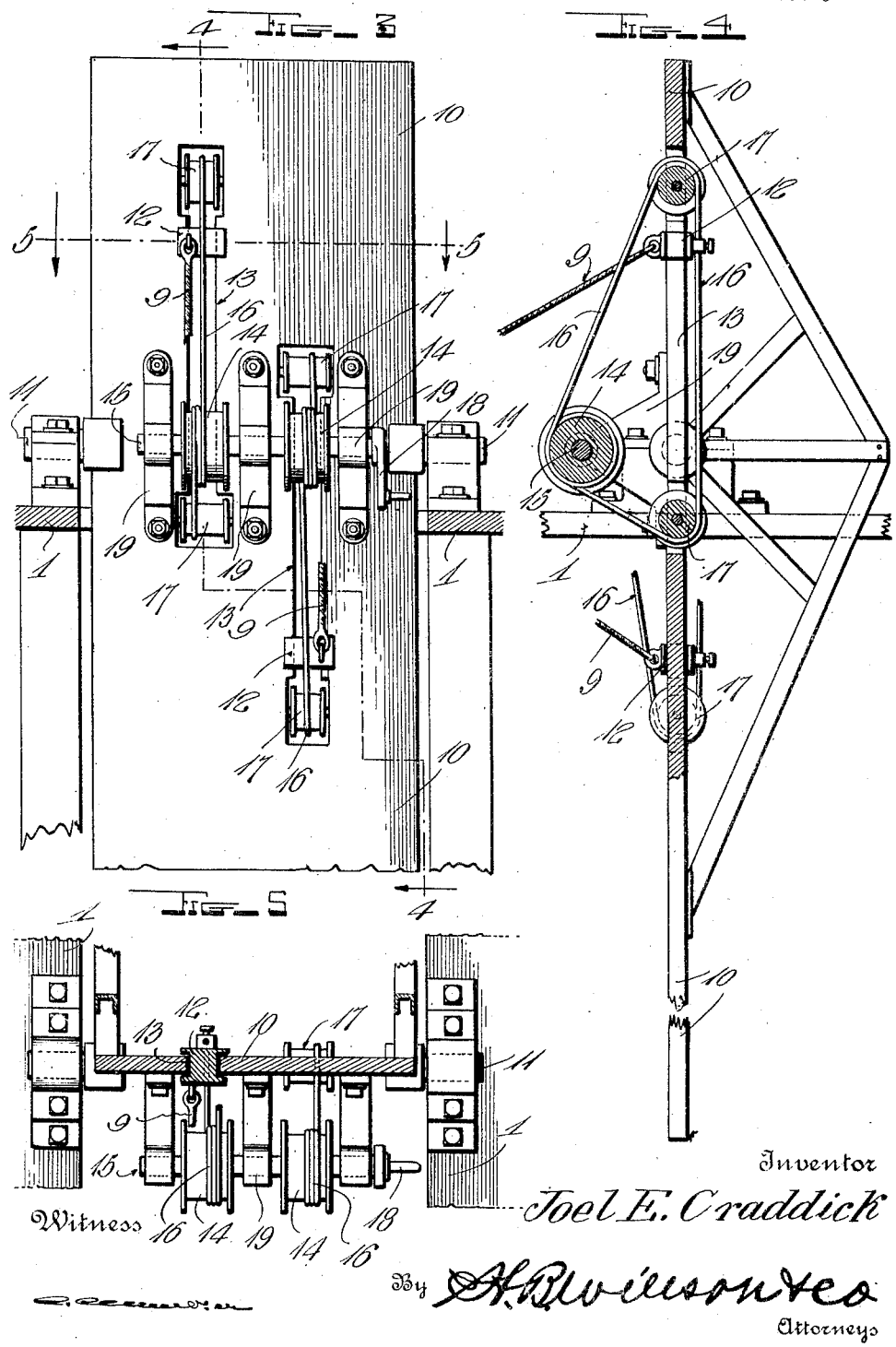

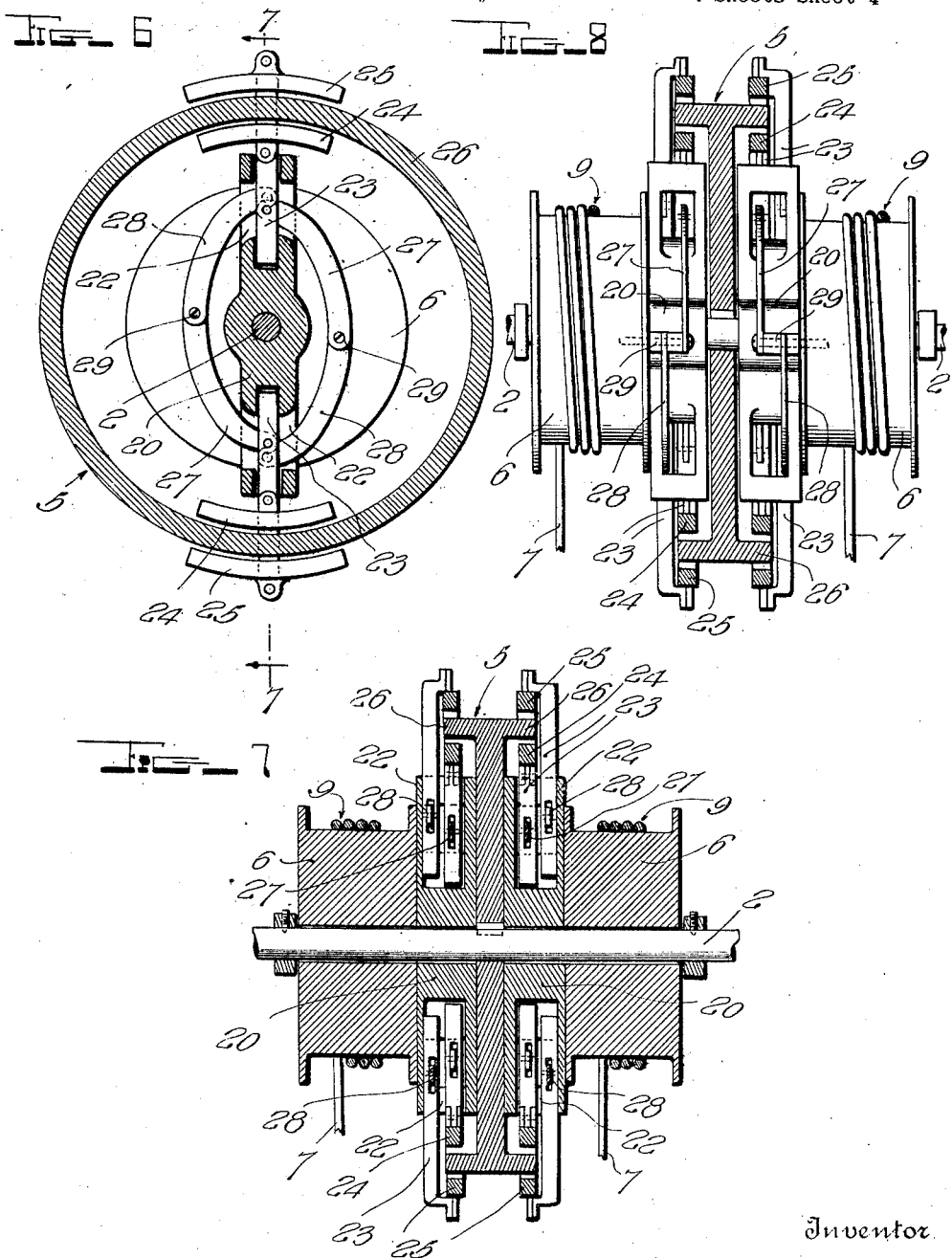

Patented Aug. 24, 1926.

1,597,145

UNITED STATES PATENT OFFICE.

JOEL E. CRADDICK, OF DENVER, COLORADO.

WAVE MOTOR.

Application filed May 21, 1923. Serial No. 640,522.

My invention relates to improvements in mechanisms commonly known as wave motors, but this machine is of a type which does not depend on the wave action for its operation, but instead, relies upon the ground swell action which extends to a depth of about forty feet over the surface of the ocean, the strongest action being at about ten feet below the mean surface of the water. This ground swell action is known to those who have made a study of conditions to be encountered in the operation of machines such as mine, and in similar machines, paddles provided for their operation, have effectively oscillated with surprising regularity. A machine of this general type was constructed at Long Beach, California and was in more or less successful operation for about four years. The principal difficulty encountered was the jerking of the shaft by the oscillation of the paddles, which difficulty I have overcome in the present machine, by the provision of unique intermittent grip devices for driving the shaft, and by using weights to turn the intermittent grip devices, the action of the ground swell being utilized to raise said weights. With the foregoing and minor objects in view, the invention resides in the novel subject matter hereinafter described and claimed, the description being supplemented by the accompanying drawings.

Figure 1 is a top plan view of a portion of a wave motor constructed in accordance with my invention.

Figure 2 is a longitudinal sectional view as indicated by line 2—2 of Fig. 1.

Figure 3 is a vertical transverse sectional view on line 3—3 of Fig. 2.

Figures 4 and 5 are respectively a vertical and a horizontal section on lines 4—4 and 5—5 of Fig. 3.

Figure 6 is a detail vertical section through the intermittent grip mechanism as indicated by line 6—6 of Fig. 1.

Figure 7 is a vertical sectional view on line 7—7 of Fig. 6.

Figure 8 is a view similar to Fig. 7 but showing certain parts in elevation.

In the drawings above briefly described, which illustrate the preferred form of my invention, the numeral 1 designates a portion of a suitable supporting structure which may well be a wharf. The mechanism described below may be mounted in any desired manner upon this supporting structure.

At 2, I have illustrated a power shaft which is provided with a fly wheel 3 by means of which power may be taken therefrom through the instrumentality of a suitable belt or the like 4. Keyed or otherwise secured upon this shaft is a wheel 5, while drums 6 are free to rotate on said shaft at opposite sides of the wheel, a pair of intermittent grip devices yet to be described, being employed for transmitting motion from either drum 6 to the wheel 5, when said drum is turned by the means described below.

A pair of cables 7 are wound in the same direction upon the drums 6 and are provided with weights 8 and means are provided for alternately winding the cables 7 upon the drums and then releasing them, whereby through the instrumentality of the intermittent grip devices, first one drum and then the other will turn the wheel 5 and the shaft 2.

For rotating the drums 6 to wind the cables 7 thereon, I employ a pair of cables 9 also wound at one end upon the drums, while at their opposite ends, these cables have suitable connection with a vertically disposed oscillatory paddle 10 which is suitably mounted upon the supporting structure 1, the two cables being connected with the paddle at opposite sides of its trunnions 11 or other pivotal axis upon which it oscillates. It will thus be seen that while one of the cables 9 is rotating its respective drum 6 to wind the cable 7 thereon, the other drum 6 and weighted cable 7 are operating to turn the wheel 5. The machine is thus double-acting which is of obvious advantage in obtaining a comparatively steady power.

In the preferred form of construction, the connections between the cables 9 and the paddle 10, are established by means of a pair of shoes 12 slidable along radial slots 13 or other guideways with which the paddle 10 is provided. It will thus be seen that the operative strokes of the cables may be varied to control the speed of the shaft 2, as moving the shoes 12 toward the pivotal axis of the paddle 10 will gradually bring the machine to a standstill, whereas outward adjustment of said shoes will increase the strokes of the cables 9. For adjusting the shoes 12, I mount either a single drum or a pair of drums 14 on a common shaft 15, upon the paddle 10, wind suitable cables 16 around the drum or drums, connect these cables with the shoes 12 and provide suitable cable-guiding sheaves or the like 17 at the ends of the guide-ways 13. The arrangement is such that when the drum shaft is turned in one direction, by means of a hand crank or other suitable device 18, the shoes 12 will be simultaneously moved outward in the guideways 13, while turning of said shaft in the other direction will move the shoes inwardly. Obviously, any desired means may be employed for holding the drum shaft in adjusted position. Similarly, this shaft may be mounted in any desired manner but I have shown appropriate bearing brackets 19 extending from the paddle 10 adjacent its pivotal axis for this purpose. By positioning the drum shaft near the axis of the paddle, its movement is slight even when the paddle is swinging to the maximum, it being therefore easily accessible for adjustment as occasion may demand.

The intermittent grip devices above referred to are preferably of the construction detailed more particularly in Figs. 6, 7, and 8. In the construction shown, a pair of carriers 20 are mounted loosely upon the shaft 2 between the drums 6 and the central web of the wheel 5, being free to float to some extent. These carriers have appropriate radial guides 22 in which shanks 23 of inner and outer friction shoes 24 and 25 are slidably mounted, said shoes being adapted to frictionally grip laterally extending circumferential flanges 26 with which the wheel 5 is provided. Push-links 27 are pivoted to the shanks 23 of the inner shoes 24 and pull-links 28 are similarly pivoted to the shanks of the outer shoes 25, all of these links being pivoted to the inner ends of the drums 6 at eccentric points, as indicated at 29 in Figs. 6 and 8.

By the arrangement described, when either cable 9 rotates its respective drum 6, the shoes 24 and 25 are disengaged from the flange 26 with which they coact and thus the cable 7 is wound on the drum without interference, to raise the weight 8. As soon as the cable 9 starts in the other direction and the weight starts to descend, however, the push-links 27 and the pull-links 28 act upon the shanks 23 so that the shoes 24 and 25 are brought into gripping contact with the wheel flange, thus establishing a driving connection between the drum and wheel so that the descending weight will rotate the shaft 2.

While the construction above described will produce a comparatively uniform rotation of the shaft 2 and will not suddenly accelerate the same when the paddle 10 is operated, it is preferable to provide some suitable form of governing means which I have indicated in Fig. 1 as consisting of an appropriate ball governor 30 suitably driven from the shaft 2 and connected by a link or the like 31 with a friction brake 32 on said shaft. This arrangement prevents the shaft 2 from rotating at an excessive rate of speed under the influence of the weights 8.

In conclusion, I wish to again direct attention to the fact that the impulses exerted by the water upon the paddle 10 are not directly imparted to the power shaft 2, these impulses being utilized merely for the purpose of raising the weights 8 which then become operative to steadily turn the shaft.

I claim:

In a ground swell machine, a supporting structure, a horizontal shaft mounted on said structure for rotation, a pair of oscillatory drums mounted on said shaft and free to rotate with respect thereto, intermittent grip connections between said drums and shaft for rotating the latter when the drums are turned in one direction, a vertically disposed paddle spaced laterally from the shaft and pivotally mounted upon the supporting structure on an axis parallel with said shaft, said paddle extending below the water level sufficiently to be oscillated by the ground swell action thereof, a pair of cables wound around the aforesaid drums respectively, each cable having an end depending from its respective drum, and weights on said depending cable ends, the other end of one cable being connected to the paddle above the pivot of the latter, the other end of the other cable being connected to said paddle below its pivot.

In testimony whereof I have hereunto affixed my signature.

JOEL E. CRADDICK.